US009649949B2

(12) United States Patent
Kim et al.

(10) Patent No.: US 9,649,949 B2
(45) Date of Patent: May 16, 2017

(54) CONNECTOR CONVERTER AND VEHICLE CHARGING SYSTEM AND METHOD USING THE SAME (71) Applicants: HYUNDAI MOTOR COMPANY, Seoul (KR); YURA CORPORATION CO., LTD.

(72) Inventors: Hyun Wook Kim, Seoul (KR); Myoung Sik Kim, Seoul (KR); Jeong Hun Lee, Hwaseong-si (KR)

(73) Assignees: Hyundai Motor Company, Seoul (KR); Yura Corporation Co., Ltd., Cheongwon-gun, Chungcheongbuk-do (KR)

( * ) Notice: Subject to any disclaimer, the term of this patent is extended or adjusted under 35 U.S.C. 154(b) by 140 days.

(21) Appl. No.: 14/535,875

(22) Filed: Nov. 7, 2014

(65) Prior Publication Data
US 2015/0224890 A1    Aug. 13, 2015

(30) Foreign Application Priority Data

Feb. 11, 2014  (KR) .................. 10-2014-0015405

(51) Int. Cl.
*H04L 12/40* (2006.01)
*H04B 3/54* (2006.01)
(Continued)

(52) U.S. Cl.
CPC ....... *B60L 11/1851* (2013.01); *B60L 11/1838* (2013.01); *H04B 3/542* (2013.01);
(Continued)

(58) Field of Classification Search
CPC .. B60L 11/1838; B60L 11/1851; H04L 12/40; H04L 69/08; H04L 12/40006; H04B 3/542
See application file for complete search history.

(56) References Cited

U.S. PATENT DOCUMENTS

2010/0268475 A1* 10/2010 Kusumoto ......... G01N 27/3274
                                                                702/19
2012/0245750 A1*  9/2012 Paul ...................... G06Q 50/06
                                                                700/291
(Continued)

FOREIGN PATENT DOCUMENTS

EP       2281711 A2   2/2011
JP    06-343203 A    12/1994
(Continued)

OTHER PUBLICATIONS

Korean Office Action issued in Korean Application No. 10-2014-0015405, dated Nov. 20, 2014.

*Primary Examiner* — Vuthe Siek
(74) *Attorney, Agent, or Firm* — McDermott Will & Emery LLP (57) ABSTRACT

A connector converter for a vehicle includes a connection controller configured to control connection between the vehicle and a charger. A communication protocol converter is configured to perform message conversion between the vehicle and the charger. The communication protocol converter employs different communication protocols when the vehicle is chargeably connected to the charger under control of the connection controller. A connector communicator is configured to transmit a message output from the communication protocol converter to the vehicle or the charger.

17 Claims, 5 Drawing Sheets (51) Int. Cl.
*B60L 11/18* (2006.01)
*H04L 29/06* (2006.01)
*H04L 29/08* (2006.01)

(52) U.S. Cl.
CPC ........ *H04L 12/40* (2013.01); *H04L 12/40006* (2013.01); *H04L 67/12* (2013.01); *H04L 69/08* (2013.01); *H04L 69/12* (2013.01); *H04L 2012/40215* (2013.01); *H04L 2012/40273* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01)

(56) References Cited

U.S. PATENT DOCUMENTS

| | | | | |
|---|---|---|---|---|
| 2013/0038424 A1* | 2/2013 | Katar | ................... | H04L 67/125 |
| | | | | 340/5.8 |
| 2013/0214738 A1* | 8/2013 | Chen | ..................... | H02J 7/02 |
| | | | | 320/109 |
| 2013/0342008 A1* | 12/2013 | Takata | ................... | H04B 3/548 |
| | | | | 307/9.1 |

FOREIGN PATENT DOCUMENTS

| | | |
|---|---|---|
| JP | 11-220813 A | 8/1999 |
| KR | 10-0313792 B1 | 10/2001 |
| KR | 10-2011-0043861 A | 4/2011 |
| KR | 10-2011-0101846 A | 9/2011 |
| KR | 10-2013-0102404 A | 9/2013 |

* cited by examiner

CONNECTOR CONVERTER AND VEHICLE CHARGING SYSTEM AND METHOD USING THE SAME

This application claims the benefit of priority to Korean Patent Application No. 10-2014-0015405, filed on Feb. 11, 2014, which is hereby incorporated by reference as if fully set forth herein.

TECHNICAL FIELD

The present disclosure relates to a connector converter and a vehicle charging system and method using the same.

BACKGROUND

Electric vehicles and chargeable vehicles have been continuously developed according to improvement of energy efficiency and demand for eco-friendly vehicles. Charging standardization is in progress in Europe, Japan, and the U.S. In Europe, three-phase power is mainly used for power facilities, and thus, a 7 pin charger for three-phase charging is generally used. For a quick charging connector, a 10 pin connector according to the Japanese CHAdeMO standard had been examined as an international standard, but now an international standard is being examined based on a combo type slow/quick charging connector proposed by the U.S. Furthermore, power line communication, which is different from a conventional controller area network (CAN) communication, has been developed due to a minimized terminal of the combo type slow/quick charging connector.

Although the electric vehicles have been continuously developed according to demand for eco-friendly vehicles, an international standard has not defined for charging of vehicles. For this reason, a large number of vehicle manufacturers and charger manufacturers manufacture products based on different specifications.

SUMMARY

The present disclosure is directed to a connector converter and a vehicle charging system and method using the same that substantially obviate one or more problems due to limitations and disadvantages of the related art.

An aspect of the present disclosure provides a connector converter that is capable of easily achieving connection between a charger connector and a vehicle using different communication specifications while maintaining compatibility with connectors used in the U.S. and Europe.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an exemplary embodiment of the present disclosure, a connector converter for a vehicle includes a connection controller configured to control connection between the vehicle and a charger. A communication protocol converter is configured to perform message conversion between the vehicle and the charger, the communication protocol converter employing different communication protocols when the vehicle is chargeably connected to the charger under control of the connection controller. A connector communicator is configured to transmit a message output from the communication protocol converter to the vehicle or the charger.

When a first communication protocol type message is received from the vehicle, the communication protocol converter may convert the first communication protocol type message into a second communication protocol type message. When the second communication protocol type message is received from the charger, the communication protocol converter may convert the second communication protocol type message into the first communication protocol type message.

The first communication protocol may be one selected from the group consisting of controller area network (CAN) communication and power line communication, and the second communication protocol may be the other selected from the group consisting of the CAN communication and the power line communication.

The connection controller may monitor a proximity detection signal from at least one selected from between the vehicle and the charger to determine whether the proximity detection signal is enabled. Upon determining that the proximity detection signal is disabled, connection controller may generate a charging completion message.

The proximity detection signal may be information indicating that the vehicle or the charger is chargeably connected to the connector converter.

When the vehicle or the charger is disconnected from the connector converter, the proximity detection signal from the vehicle may be disabled.

When the charger receives a charging completion request message from a user, the proximity detection signal may be disabled.

According to another exemplary embodiment of the present disclosure, a vehicle charging system for a vehicle includes a connector converter configured to check a connection state between the vehicle and a charger. Upon determining that the vehicle and the charger are chargeably connected to each other, the connector converter performs message conversion between the vehicle and the charger employing different communication protocols. The vehicle generates charging initialization information based on the message conversion and performs charging of a battery of the vehicle based on the generated charging initialization information.

The charging initialization information may include remaining charging time information.

The connector converter may convert first communication protocol type charging parameter information received from the charger into second communication protocol type charging parameter information corresponding to a communication protocol version of the vehicle. The vehicle may calculate second communication protocol type remaining charging time information using the second communication protocol type charging parameter information.

The charging parameter information may include at least one selected from the group consisting of maximum rated voltage information and maximum rated current information of the charger.

The connector converter may update charging state information. The charging state information may include at least one selected from among charging voltage, charging current, and remaining charging time information of the charger.

The connector converter may convert, upon receiving a second communication protocol type charging state request message from the vehicle, stored first communication protocol type charging state information into second communication protocol type charging state information and update the stored first communication protocol type charging state information using the converted second communication protocol type charging state information.

According to another exemplary embodiment of the present disclosure, a vehicle charging method includes checking a connection state between a vehicle and a charger by a connector converter, upon determining that the vehicle and the charger are chargeably connected to each other. Message conversion between the vehicle and the charger is performed employing different communication protocols by the connector converter. Charging initialization information is generated based on the message conversion by the vehicle. Charging of a battery of the vehicle is performed based on the generated charging initialization information by the vehicle.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Reference will now be made in detail to exemplary embodiments of the present disclosure, examples of which are illustrated in the accompanying drawings. Terminology used in this specification and claims must not be construed as limited to the general or dictionary meanings thereof and should be interpreted as having meanings and concepts matching the technical idea of the present disclosure based on the principle that an inventor is able to appropriately define the concepts of the terminologies to describe the invention in the best way possible. The embodiment disclosed herein and configurations shown in the accompanying drawings are only one embodiment and do not represent the full technical scope of the present invention. Therefore, it is to be understood that the present disclosure covers the modifications and variations of this invention provided they come within the scope of the appended claims and their equivalents when this application was filed.

Figure 1:
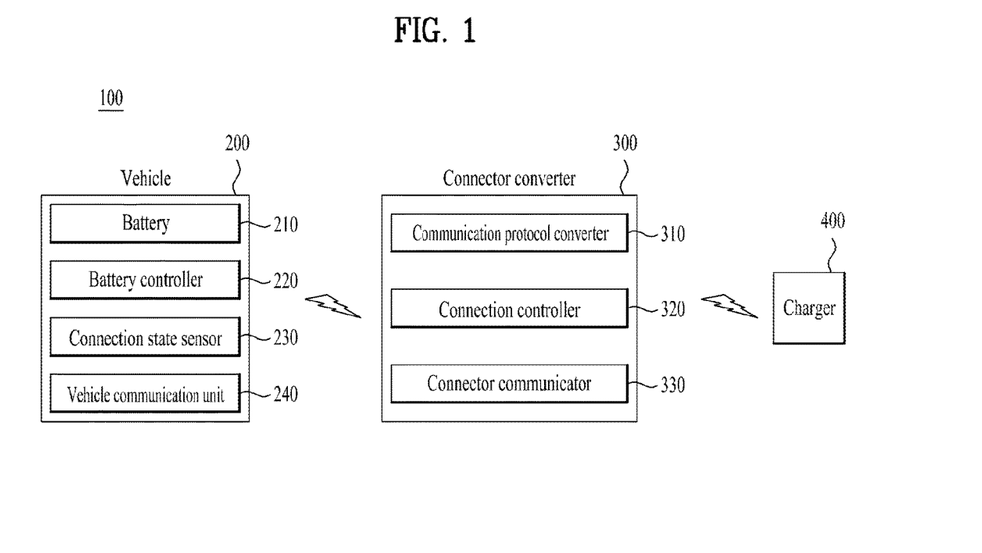
FIG. 1 is a schematic block diagram of a vehicle charging system according to an embodiment of the present disclosure.

FIG. 1 is a schematic block diagram of a vehicle charging system 100 according to an embodiment of the present disclosure.

The vehicle charging system 100 for a vehicle 200 includes a connector converter 300 and a charger 400.

Referring to FIG. 1, the vehicle 200 includes a battery 210, a battery controller 220, a connection state sensor 230, and a vehicle communicator 240.

The battery 210 provides power necessary to drive the vehicle 200 and includes a plurality of cells to store electrical energy.

The battery controller 220 is configured to control a charging state of the battery 210. Specifically, the battery controller 220 monitors voltage, current, and remaining capacity of the battery 210 to maintain an optimum charging state. In addition, the battery controller 220 controls the battery 210 not to be overcharged or overdischarged.

The connection state sensor 230 senses a connection state between the vehicle 200 and the connector converter 300. In addition, the connection state sensor 230 generates a proximity detection signal to indicate normal connection between the vehicle 200 and the connector converter 300.

The vehicle communicator 240 is configured to transmit and receive information for vehicle charging control to and from the connector converter 300 in a wired/wireless fashion.

The connector converter 300 includes a communication protocol converter 310, a connection controller 320, and a connector communicator 330.

The communication protocol converter 310 is configured to perform mutual conversion between messages according to different types of communication protocols. For example, the vehicle 200 may be based on a first communication protocol, and the charger 400 may be based on a second communication protocol. In this case, the communication protocol converter 310 converts a first communication protocol type message from the vehicle 200 into a second communication protocol type message. Reversely, the communication protocol converter 310 converts the second communication protocol type message from the charger 400 into the first communication protocol type message. Consequently, mutual compatibility is maintained between the vehicle 200 and the charger 400 employing different communication protocols. The first communication protocol is controller area network (CAN) communication and the second communication protocol is power line communication (PLC). Conversely, the first communication protocol may be power line communication and the second communication protocol may be CAN communication.

The connection controller 320 is configured to control connection between the vehicle 200 and the charger 400. The connection controller 320 includes an unlocking prevention relay. Disconnection between the vehicle 200 and the charger 400 is prevented according to operation of the unlocking prevention relay. On the other hand, the connection controller 320 may monitor a proximity detection signal to control charging completion of the vehicle 200, which will be described in detail with reference to FIG. 2.

The connector communicator 330 communicates with the vehicle 200 or the charger 400 in the wired/wireless fashion. The connector communicator 330 receives a message from the vehicle 200 or the charger 400, or transmits a message generated by the communication protocol converter 310 and the connection controller 320 to the vehicle 200 or the charger 400.

Figure 2:
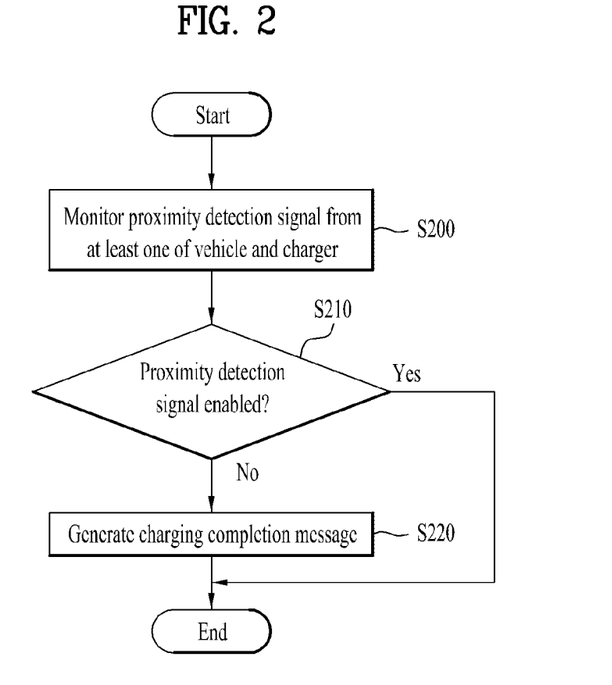
FIG. 2 is a flowchart showing a method of controlling, by a connection controller, vehicle charging completion using a proximity detection signal according to an embodiment of the present disclosure.

FIG. 2 is a flowchart showing a method of controlling, by the connection controller, vehicle charging completion using a proximity detection signal according to an embodiment of the present disclosure.

Referring to FIG. 2, the connection controller 320 monitors a proximity detection signal from at least one selected from between the vehicle 200 and the charger 400 (S200).

Based on the monitoring result at step S200, the connection controller 320 determines whether the proximity detection signal is enabled (S210). For example, when the connector converter 300 is disconnected from the vehicle 200, a proximity detection signal from the vehicle 200 may be disabled. Similarly, when the connector converter 300 is disconnected from the charger 400, a proximity detection signal from the charger 400 may be disabled. Otherwise, when the charger 400 receives a charging completion request message from a user, the proximity detection signal may be disabled. On the other hand, when the connector converter 300 is chargeably connected to the vehicle 200 and the charger 400, the proximity detection signal may be enabled.

Upon determining at step S210 that the proximity detection signal is disabled, the connection controller 320 generates a charging completion message (S220). The generated charging completion message may be transmitted to at least one selected from between the vehicle 200 and the charger 400 via the connector communicator 330.

In embodiments described hereinafter with reference to FIGS. 3 to 5, it is assumed that, in the vehicle charging system 100, the charger 400 and the connector converter 300 are connected to each other and the vehicle 200 and the connector converter 300 are connected to each other. The charger 400 may be based on the first communication protocol, and the vehicle 200 may be based on the second communication protocol.

Figure 3:
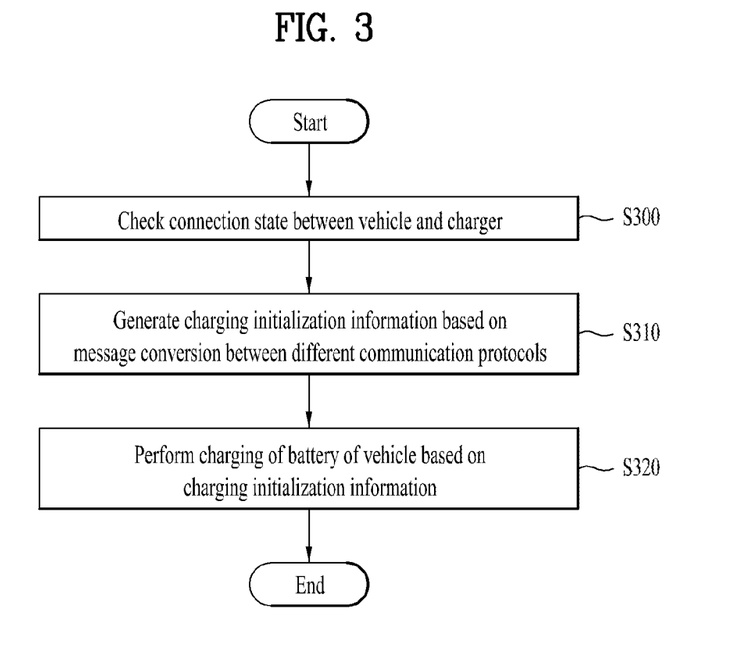
FIG. 3 is a flowchart showing a method of charging, by a vehicle charging system, a vehicle in conjunction with data communication between different communication protocols according to an embodiment of the present disclosure.

FIG. 3 is a flowchart showing a method of charging, by a vehicle charging system, a vehicle in conjunction with data communication between different communication protocols according to an embodiment of the present disclosure.

Referring to FIG. 3, the connector converter 300 checks a connection state between the vehicle 200 and the charger 400 (S300).

Specifically, the connector converter 300 monitors a proximity detection signal from the vehicle 200 and the charger 400 and checks a connection state between the vehicle 200 and the charger 400 based on determination as to whether the proximity detection signal is enabled. That is, when the proximity detection signal from the vehicle 200 and the charger 400 is enabled, the connector converter 300 determines that the vehicle 200 and the charger 400 are chargeably connected to each other.

Additionally, the connector converter 300 checks a connection state between the vehicle 200 and the charger 400 based on connection locking state information indicating an operation state of an unlocking prevention relay. The unlocking prevention relay is provided to prevent disconnection between the vehicle 200 and the charger 400. It is possible to secondarily verify connection between the vehicle 200 and the charger 400 using the connection locking state information indicating the operation state of the unlocking prevention relay. That is, when the connection locking state information is ON, the unlocking prevention relay operates to prevent the disconnection between the vehicle 200 and the charger 400.

Upon determining at step S300 that the vehicle 200 and the charger 400 are chargeably connected to each other, the vehicle 200 generates charging initialization information based on message conversion between different communication protocols at the connector converter 300 (S310). The message conversion between different communication protocols means conversion of a first communication protocol type message into a second communication protocol type message or conversion of a second communication protocol type message into a first communication protocol type message. As previously described, the first communication protocol may mean any one selected from the group consisting of CAN communication and power line communication, and the second communication protocol may mean the other. The charging initialization information includes remaining charging time information. A method of generating the charging initialization information will be described in detail with reference to FIG. 4.

The vehicle 200 performs charging of the battery based on the charging initialization information (S320). In addition, the vehicle charging system 100 also updates charging state information, which will be described in detail with reference to FIG. 5.

Figure 4:
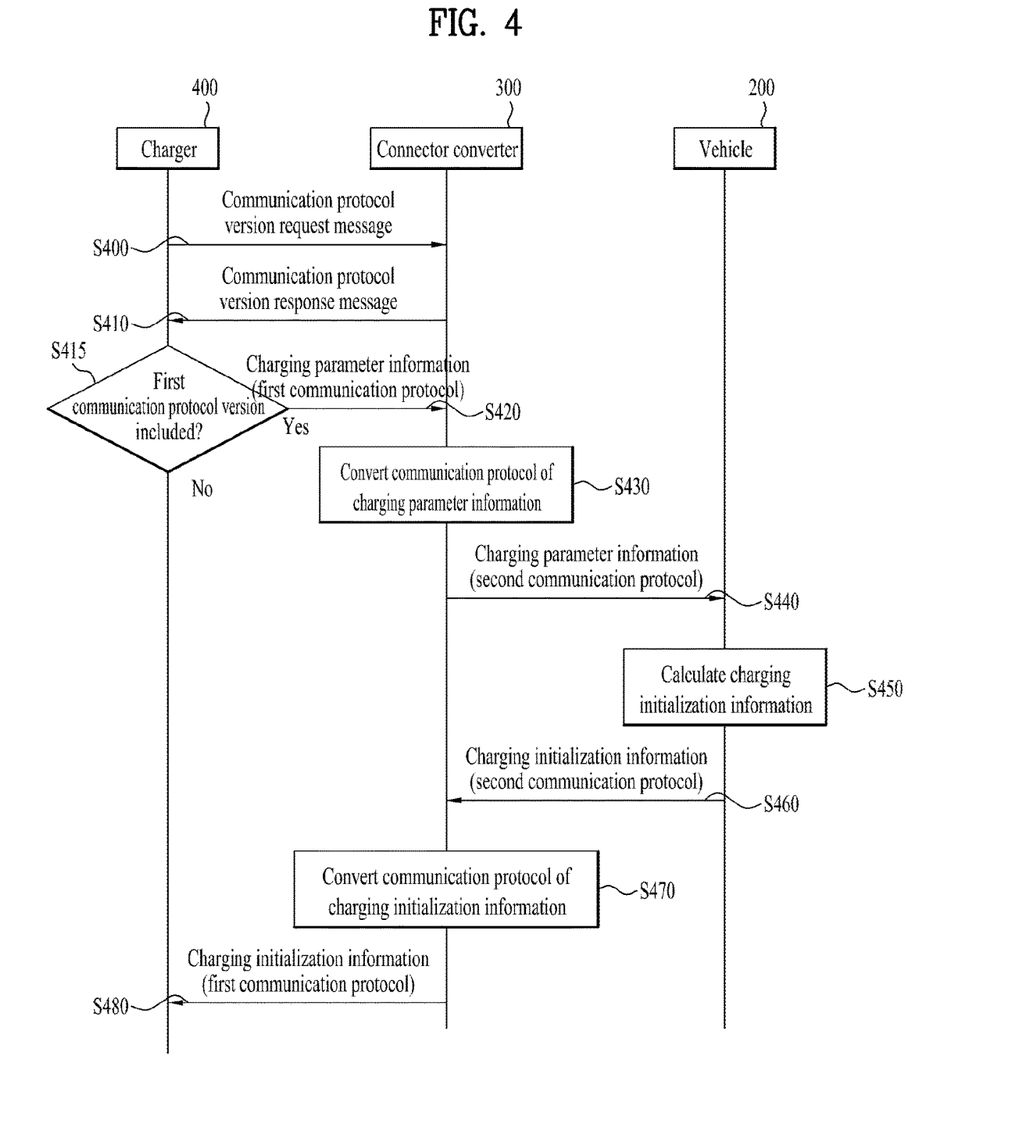
FIG. 4 is a flowchart showing a method of generating, by the vehicle charging system, charging initialization information based on message conversion between different communication protocols according to an embodiment of the present disclosure.

FIG. 4 is a flowchart showing a method of generating, by a vehicle charging system, charging initialization information based on message conversion between different communication protocols according to an embodiment of the present disclosure.

Referring to FIG. 4, the charger 400 transmits a communication protocol version request message to the connector converter 300 (S400). The communication protocol version request message means a message to request a communication protocol version supported by the connector converter 300.

The connector converter 300 transmits a communication protocol version response message to the charger 400 in response to the communication protocol version request message (S410). The communication protocol version response message includes information regarding the communication protocol version supported by the connector converter 300. For example, the information regarding the communication protocol version includes a CAN communication protocol and a power line communication protocol.

The charger 400 determines whether the communication protocol version according to the received communication protocol version response message includes a first communication protocol version (S415).

Upon determining at step S415 that the communication protocol version according to the communication protocol version response message does not include the first communication protocol version of the charger 400, subsequent steps S420 to S480 are not performed.

On the other hand, upon determining at step S415 that the communication protocol version according to the communication protocol version response message includes the first communication protocol version of the charger 400, the charger 400 transmits first communication protocol type charging parameter information to the connector converter 300 (S420). The charging parameter information includes at least one selected from the group consisting of maximum rated voltage information and maximum rated current information of the charger 400.

The connector converter 300 converts the first communication protocol type charging parameter information into second communication protocol type charging parameter information corresponding to a communication protocol version of the vehicle 200 (S430).

The connector converter 300 transmits the converted second communication protocol type charging parameter information to the vehicle 200 (S440).

The vehicle 200 calculates second communication protocol type charging initialization information using the received second communication protocol type charging parameter information (S450). For example, the vehicle 200 decides a chargeable current amount based on remaining capacity of the battery. Subsequently, the vehicle 200 calculates remaining charging time information based on the decided chargeable current amount and the maximum rated voltage and current information of the charger 400.

The vehicle 200 transmits the second communication protocol type charging initialization information to the connector converter 300 (S460).

Subsequently, the connector converter 300 converts the received second communication protocol type charging initialization information into first communication protocol type charging initialization information (S470) and transmits the converted first communication protocol type charging initialization information to the charger 400 (S480).

Figure 5:
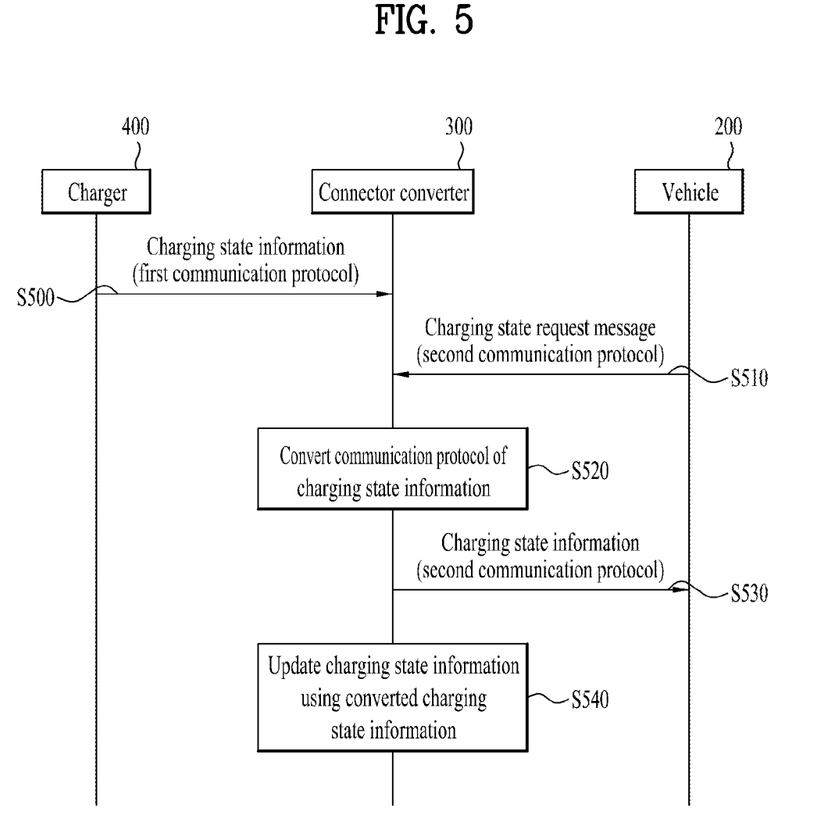
FIG. 5 is a flowchart showing a method of updating, by the vehicle charging system, charging state information based on message conversion between different communication protocols according to an embodiment of the present disclosure.

FIG. 5 is a flowchart showing a method of updating, by the vehicle charging system, charging state information based on message conversion between different communication protocols according to an embodiment of the present disclosure.

Referring to FIG. 5, the charger 400 transmits first communication protocol type charging state information to the connector converter 300 (S500). The charging state information includes at least one selected from among charging voltage, charging current, and remaining charging time information of the charger 400. The transmitted charging state information may be stored in the connector converter 300. To this end, the connector converter 300 may further include a temporary memory (not shown).

Upon receiving a second communication protocol type charging state request message from the vehicle 200 (S510), the connector converter 300 converts the first communication protocol type charging state information received from the charger 400 into second communication protocol type charging state information (S520).

The connector converter 300 transmits the converted second communication protocol type charging state information to the vehicle 200 (S530). In addition, the connector converter 300 updates the first communication protocol type charging state information stored in the connector converter 300 using the converted second communication protocol type charging state information (S540). Steps S500 to S540 are repeatedly performed to update vehicle state information until charging of the battery 210 is completed.

As is apparent from the above description, it is possible to achieve data communication and charging between the vehicle and the charger using the connector converter to interconnect the vehicle and the charger irrespective of whether the charger is a CHAdeMO charger or a combo charger.

In particular, it is possible to achieve communication and charging between a vehicle based on CAN communication and a combo charger based on power line communication. Further, it is possible to achieve communication and charging between a vehicle based on power line communication and a CHAdeMO charger based on CAN communication.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A connector converter for a vehicle comprising:
   a connection controller configured to control connection between the vehicle and an external charger;
   a communication protocol converter configured to perform message conversion between the vehicle and the external charger, the communication protocol converter employing at least a first communication protocol and a second communication protocol, when the vehicle is chargeably connected to the external charger under control of the connection controller; and
   a connector communicator configured to transmit a message output from the communication protocol converter to the vehicle or the external charger,
   wherein when a first message based on the first communication protocol is received from the vehicle, the communication protocol converter converts the first message into a second message based on the second communication protocol,
   wherein when the second message based on the second communication protocol is received from the external charger, the communication protocol converter converts the second message into the first message based on the first communication protocol, and
   wherein, upon receiving a communication protocol type charging state request message from the vehicle, stored first communication protocol type charging state information is converted into second communication protocol type charging state information and the stored first communication protocol type charging state information is updated using the converted second communication protocol type charging state information.

2. The connector converter according to claim 1, wherein the first communication protocol is one selected from the group consisting of controller area network (CAN) communication and power line communication, and the second communication protocol is the other selected from the group consisting of the CAN communication and the power line communication.

3. The connector converter according to claim 1, wherein the connection controller monitors a proximity detection signal from at least one selected from between the vehicle and the external charger to determine whether the proximity detection signal is enabled, and upon determining that the proximity detection signal is disabled, the connection controller generates a charging completion message.

4. The connector converter according to claim 3, wherein the proximity detection signal is information indicating that the vehicle or the external charger is chargeably connected to the connector converter.

5. The connector converter according to claim 4, wherein when the vehicle or the external charger is disconnected from the connector converter, the proximity detection signal from the vehicle is disabled.

6. The connector converter according to claim 4, wherein when the external charger receives a charging completion request message from a user, the proximity detection signal is disabled.

7. A vehicle charging system for a vehicle comprising:
   a connector converter configured to check a connection state between the vehicle and an external charger,
   wherein upon determining that the vehicle and the external charger are chargeably connected to each other, the connector converter performs message conversion between the vehicle and the external charger by employing at least a first communication protocol and a second communication protocol, wherein the vehicle generates charging initialization information based on the message conversion, wherein the vehicle performs charging of a battery of the vehicle based on the generated charging initialization information, wherein the connector converter performs the message conversion by converting a message based on the first communication protocol into a message based on the second communication protocol, wherein the connector converter performs the message conversion by converting a message based on the second communication protocol into a message based on the first communication protocol, and wherein the connector converter converts, upon receiving a communication protocol type charging state request message from the vehicle stored first communication protocol type charging state information into second communication protocol type charging state information and updates the stored first communication protocol type charging state information using the converted second communication protocol type charging state information.

8. The vehicle charging system according to claim 7, wherein
the communication protocols comprise a first communication protocol and a second communication protocol, and
the first communication protocol is one selected from the group consisting of CAN communication and power line communication and the second communication protocol is the other selected from the group consisting of the CAN communication and the power line communication.

9. The vehicle charging system according to claim 8, wherein the charging initialization information comprises remaining charging time information.

10. The vehicle charging system according to claim 9, wherein the connector converter converts first communication protocol type charging parameter information received from the external charger into second communication protocol type charging parameter information corresponding to a communication protocol version of the vehicle,
wherein the vehicle calculates second communication protocol type remaining charging time information using the second communication protocol type charging parameter information, and
wherein the communication protocol version of the vehicle indicates a type of communication protocol supported by the vehicle.

11. The vehicle charging system according to claim 10, wherein the charging parameter information comprises at least one selected from the group consisting of maximum rated voltage information and maximum rated current information of the external charger.

12. The vehicle charging system according to claim 7, wherein
the connector converter updates charging state information, and
the charging state information comprises at least one selected from among charging voltage, charging current, and remaining charging time information of the external charger.

13. A vehicle charging method comprising steps of:
checking, by a connector converter, a connection state between a vehicle and an external charger;
performing, by the connector converter, message conversion between the vehicle and the external charger employing at least a first communication protocol and a second communication protocol upon determining that the vehicle and the external charger are chargeably connected to each other;
generating, by the vehicle, charging initialization information based on the message conversion; and
performing, by the vehicle, charging of a battery of the vehicle based on the generated charging initialization information,
wherein the step of performing the message conversion comprises:
converting a message based on the first communication protocol into a message based on the second communication protocol;
converting a message based on the second communication protocol into a message based on the first communication protocol;
transmitting, by the external charger, first communication protocol type charging state information to the connector converter; and
converting, by the connector converter, the first communication protocol type charging state information received from the external charger into second communication protocol type charging state information, upon receiving a communication protocol type charging state request message from the vehicle;
transmitting, by the connector converter, the converted second communication protocol type charging state information to the vehicle; and
updating, by the connector converter, the first communication protocol type charging state information stored in the connector converter using the converted second communication protocol type charging state information.

14. The vehicle charging method according to claim 13, the step of generating the charging initialization information includes:
transmitting, by the external charger, a communication protocol version request message to the connector converter;
transmitting, by the connector converter, a communication protocol version response message to the external charger in response to the communication protocol version request message;
determining, by the external charger, whether the communication protocol version according to the received communication protocol version response message includes a first communication protocol version; and
transmitting first communication protocol type charging parameter information to the connector converter, upon determining that the communication protocol version includes the first communication protocol version of the external charger,
wherein the communication protocol version indicates a type of communication protocol supported by the vehicle.

15. The vehicle charging method according to claim 14, after the step of determining the communication protocol version, if the communication protocol version does not include the first communication protocol version of the external charger, the method is finished.

16. The vehicle charging method according to claim 14, after the step of transmitting the first communication protocol type charging parameter information, further comprising:

converting, by the connector converter, the first communication protocol type charging parameter information into second communication protocol type charging parameter information corresponding to a communication protocol version of the vehicle;

transmitting, by the connector converter, the converted second communication protocol type charging parameter information to the vehicle;

calculating, by the vehicle, second communication protocol type charging initialization information using the received second communication protocol type charging parameter information;

transmitting, by the vehicle, the second communication protocol type charging initialization information to the connector converter;

converter, by the connector converter, the received second communication protocol type charging initialization information into first communication protocol type charging initialization information, and transmitting the converted first communication protocol type charging initialization information to the external charger.

17. A non-transitory computer-readable medium including instructions execution of which causes a controller to perform the steps of claim 13.

* * * * *